United States Patent
Lavrisiuk et al.

(10) Patent No.: US 11,042,178 B2
(45) Date of Patent: Jun. 22, 2021

(54) PROVIDING DEMAND RESPONSE

(71) Applicant: Honeywell International Inc., Morris Plains, NJ (US)

(72) Inventors: Victor Lavrisiuk, Aurora, OH (US); Michael Haling, Broadview Heights, OH (US); Debra Lynn Pugel, Kent, OH (US); Rob Warner, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/517,521

(22) Filed: Jul. 19, 2019

(65) Prior Publication Data

US 2019/0346871 A1    Nov. 14, 2019

Related U.S. Application Data

(63) Continuation of application No. 15/254,856, filed on Sep. 1, 2016, now abandoned.

(51) Int. Cl.
*G05F 1/66* (2006.01)
*G05B 19/048* (2006.01)
*G05B 15/02* (2006.01)
*H02J 3/14* (2006.01)

(52) U.S. Cl.
CPC ............. *G05F 1/66* (2013.01); *G05B 15/02* (2013.01); *G05B 19/048* (2013.01); *H02J 3/14* (2013.01); *Y02B 70/3225* (2013.01); *Y04S 20/222* (2013.01)

(58) Field of Classification Search
CPC ......... G05B 15/02; G05B 19/048; G05F 1/66; H02J 2310/12; H02J 3/14; Y02B 70/3225; Y04S 20/222
See application file for complete search history.

(56) References Cited

U.S. PATENT DOCUMENTS

| | | | |
|---|---|---|---|
| 6,577,962 B1 | 6/2003 | Afshari | |
| 7,925,388 B2 | 4/2011 | Ying | |
| 8,073,558 B2 | 12/2011 | Koch et al. | |
| 8,417,391 B1* | 4/2013 | Rombouts | G06Q 10/06 700/291 |
| 9,898,025 B2 | 2/2018 | Li et al. | |
| 2005/0116814 A1 | 6/2005 | Rodgers et al. | |
| 2007/0220907 A1 | 9/2007 | Ehlers | |
| 2009/0077397 A1* | 3/2009 | Shnekendorf | H02J 3/14 713/310 |
| 2010/0179708 A1 | 7/2010 | Watson et al. | |

(Continued)

OTHER PUBLICATIONS

Siemens; Automated Demand Response (ADR) Client User Guide; Jul. 2011, Siemens Industry, Inc., Rev. 1 p. 1-34. (Year: 2011).*

*Primary Examiner* — Kidest Bahta
(74) *Attorney, Agent, or Firm* — Seager, Tufte & Wickhem, LLP

(57) ABSTRACT

Devices, methods, and systems for providing demand response are described herein. One device includes instructions executable to receive an indication of a demand response event, determine, based on a configuration made using a user interface, an action to be taken by a load of a facility in response to the demand response event, communicate the determined action to a controller associated with the load, and monitor a status of the action as the action is taken.

20 Claims, 6 Drawing Sheets

(56) References Cited

U.S. PATENT DOCUMENTS

| | | |
|---|---|---|
| 2010/0191487 A1 | 7/2010 | Rada et al. |
| 2010/0292856 A1 | 11/2010 | Fujita |
| 2011/0172845 A1 | 7/2011 | Kulyk et al. |
| 2011/0172846 A1 | 7/2011 | Kulyk et al. |
| 2012/0101651 A1 | 4/2012 | Haynes |
| 2012/0271475 A1 | 10/2012 | Wang et al. |
| 2012/0330473 A1 | 12/2012 | Meredith et al. |
| 2013/0002020 A1 | 1/2013 | Hyde et al. |
| 2013/0245853 A1 | 9/2013 | Kulyk et al. |
| 2013/0268136 A1 | 10/2013 | Cox et al. |
| 2013/0345891 A1 | 12/2013 | Beyerle et al. |
| 2014/0062195 A1* | 3/2014 | Bruschi .................. B60L 53/68 307/38 |
| 2014/0178843 A1 | 6/2014 | Smyth |
| 2014/0277795 A1* | 9/2014 | Matsuoka .......... G06Q 30/0202 700/291 |
| 2014/0324507 A1* | 10/2014 | Koch ............... G06Q 10/06312 705/7.22 |
| 2015/0276253 A1 | 10/2015 | Montalvo |

\* cited by examiner

DEMAND CONTROL

DEMAND CONTROL MONITORING | DEMAND CONTROL SETTINGS

CURRENT STATUS

| | | | |
|---|---|---|---|
| DR EVENT | INACTIVE | CURRENT Kw | 3347 KW |
| OPERATION MODE | LIMITING - OFF PEAK | SHED TARGET | 3872 KW |
| LOADS SHED | 0 (0%) | BASELINE | 0 KW |
| LOADS DOWN | 0 | SHED ABOVE | 3795 KW |
| OUTDOOR TEMP | 0.00 °F | RESTORE BELOW | 3717 KW |
| OVERLIMIT ALERT | NORMAL | OVERLIMIT SETPOINT | 3892 KW |

VIEWS

- EVENT LEVEL CONFIGURATION
- BASELINE HISTORY
- DEMAND RESPONSE SCHEDULE
- LIMITING SCHEDULE
- LIMITING TARGETS

DEMAND LOADS OVERVIEW

| NAME | TYPE | DEMAND CONTROL | SHED GROUP | COMMAND STATUS | ACTUAL STATUS | TIME IN SHED | TIME IN RESTORE | ZONE TEMP | ACTIVE SETPOINT | LOAD FEEDBACK | STANDBY LOAD |
|---|---|---|---|---|---|---|---|---|---|---|---|
| RTU RECEIVING | RTU | DISABLED | NONE | RESTORED | RESTORED | 0 MIN | 0 MIN | 0.0 °F | 0.0 °F | OFF | |
| RTU RECEIVING | RTU | DISABLED | NONE | RESTORED | RESTORED | 0 MIN | 0 MIN | 1.0 °F | 60.0 °F | OFF | |
| RTU RECEIVING | RTU | DISABLED | NONE | RESTORED | RESTORED | 0 MIN | 0 MIN | 0.0 °F | 0.0 °F | OFF | |
| RTU SALES MIDDLE | RTU | DISABLED | NONE | RESTORED | RESTORED | 0 MIN | 0 MIN | 0.0 °F | 0.0 °F | OFF | |

Fig. 2

| NAME | TYPE | SHED GROUP | SHED STRATEGY | SETPOINT ADJUST | MIN SHED TEMP | MAX SHED TEMP | ACTIVE IN COOL | ACTIVE IN HEAT | FAN ON IN HEAT | LIGHT OUTPUT | STANDBY LOAD |
|---|---|---|---|---|---|---|---|---|---|---|---|
| ○ RTU RECEIVING | RTU | GROUP 1 | SETPOINT ADJUST | 0.0Δ°F | 50.0°F | 88.0°F | NO | NO | NO | NO | NO |
| ○ RTU SALES | RTU | GROUP 1 | SETPOINT ADJUST | 0.0Δ°F | 50.0°F | 88.0°F | NO | NO | NO | NO | NO |
| ○ RTU SALES FRONT | RTU | GROUP 2 | SETPOINT ADJUST | 0.0Δ°F | 50.0°F | 88.0°F | NO | NO | NO | NO | NO |
| ○ RTU SALES MIDDLE | RTU | GROUP 2 | SETPOINT ADJUST | 0.0Δ°F | 50.0°F | 88.0°F | NO | NO | NO | NO | NO |

DEMAND LIMITING PEAK TARGETS

| SCHEDULE NAME | TYPE | SUMMARY | PEAK TARGET | ALT PEAK TARGET | OFF PEAK TARGET |
|---|---|---|---|---|---|
| TODAY | SPECIAL | DATE: 16 NOV 2015 | 6300 | 5500 | 4530 |
| THANKSGIVING | SPECIAL | DATE: 16 NOV 2015 | 6300 | 5500 | 4530 |
| CHRISTMAS | SPECIAL | DATE: 16 NOV 2015 | 6300 | 5500 | 4530 |
| APRIL | ALTERNATE | DATE RANGE: *.*-*.* | 5200 | 5000 | 4000 |
| MARCH | ALTERNATE | DATE RANGE: *.*-*.* | 5500 | 5000 | 4000 |
| JANUARY | ALTERNATE | DATE RANGE: *.*-*.* | 6000 | 5000 | 4000 |
| FEBRUARY | ALTERNATE | DATE RANGE: *.*-*.* | | | |
| WEEKLY | WEEKLY | WEEK SCHEDULE | | | |

JANUARY

ALTERNATE JANUARY PEAK

[5000] kW [0 - 9999]

OK    CANCEL

Fig. 5

PROVIDING DEMAND RESPONSE

The present application is a continuation of U.S. patent application Ser. No. 15/254,856, filed Sep. 1, 2016, entitled, "Providing Demand Response" which is hereby incorporated by reference.

TECHNICAL FIELD

The present disclosure relates to devices, methods, and systems for providing demand response.

BACKGROUND

Demand response can include voluntary changes in electricity usage of an electric utility customer (e.g., facility) to better match the demand for power with the supply. Demand response can allow for the reduction of load on electrical grids based on signals that are sent to facilities. For example, a demand response request sent to a facility by an electricity supplier or other grid management entity can result in some number of loads in that facility being shut down and/or running at reduced capacity.

During demand response when equipment is shutdown or running at reduced capacity, it can be possible to adversely affect conditions in the facility. In addition, a demand response event can have different intensity levels. Previous approaches to demand response may not provide sufficient flexibility to accommodate different event intensity levels while maintaining for adequate control of facility equipment without impact to conditions. For instance, facility loads may be set to take one action only during demand response despite differing event severity levels. Additionally, there may be multiple settings for demand response located in different locations in user interfaces resulting in an over-complicated workflow. Previous user interfaces for demand response configuration in a facility may not provide a way for building managers to quickly configure a large number of loads while also being able to customize a demand response strategy. Further, previous interfaces may not provide a summary of the demand response strategy that has been configured for a given facility.

BRIEF DESCRIPTION OF THE DRAWINGS

FIG. 2 illustrates a user interface associated with monitoring demand control in accordance with one or more embodiments of the present disclosure.

FIG. 3 illustrates an interface associated with configuring loads in accordance with one or more embodiments of the present disclosure.

FIG. 4 illustrates an interface associated with scheduling limiting events in accordance with one or more embodiments of the present disclosure.

FIG. 5 illustrates an interface associated with modifying peak targets in accordance with one or more embodiments of the present disclosure.

DETAILED DESCRIPTION

Figure 1:
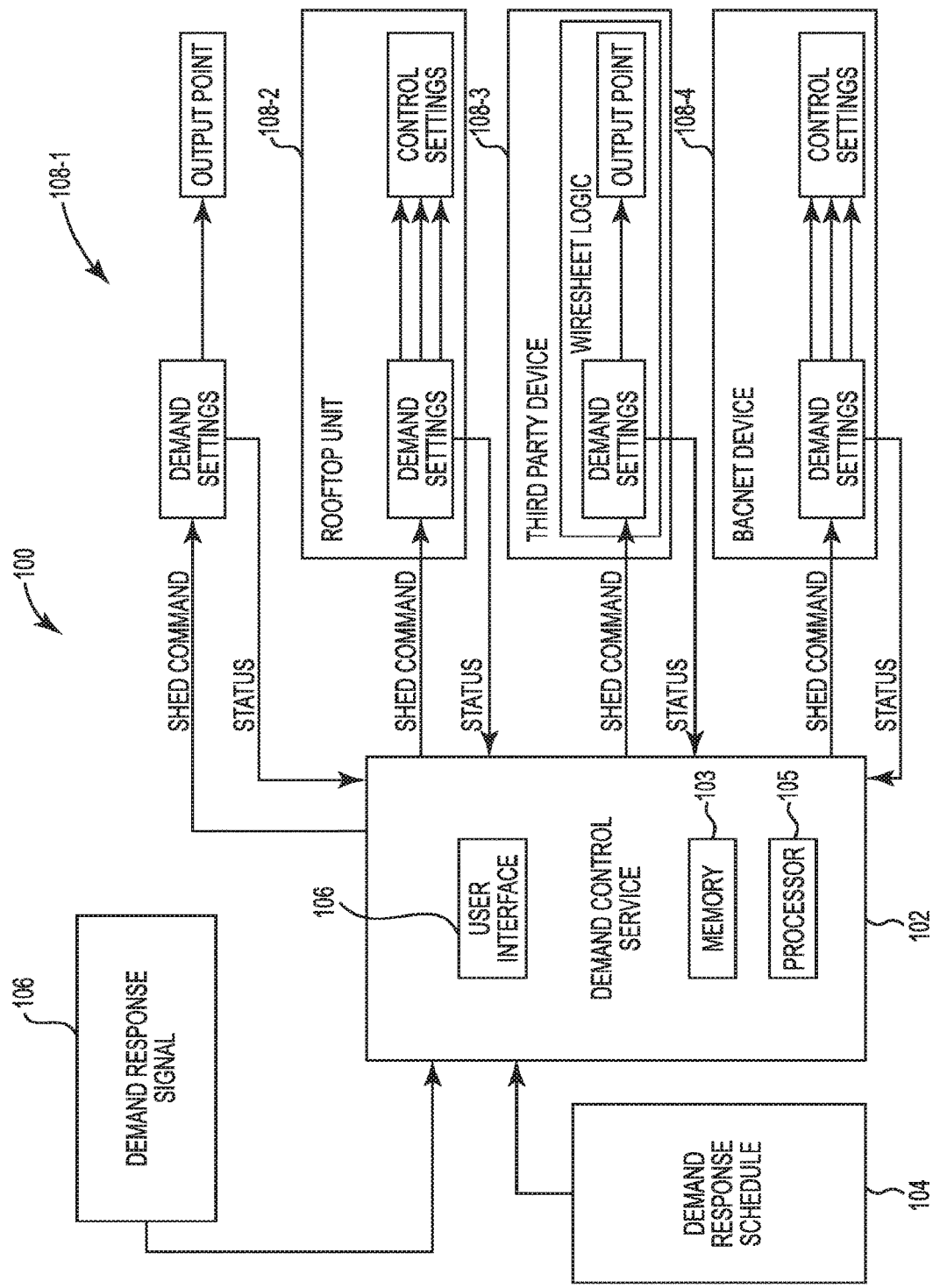
FIG. 1 illustrates a system for providing demand response in accordance with one or more embodiments of the present disclosure.

Devices, methods, and systems for providing demand response are described herein. For example, one or more embodiments include a device having instructions stored thereon executable to receive an indication of a demand response event, determine, based on a configuration made using a user interface, an action to be taken by a load of a facility in response to the demand response event, communicate the determined action to a controller associated with the load, and monitor a status of the action as the action is taken.

Demand response, as referred to herein, can include voluntary changes in electricity usage by an electric utility customer (e.g., facility) in response to a request by an electricity supplier or other grid management entity; this request typically occurs when there is heavy demand for electricity on the electrical grid, and is intended to prevent temporary electricity shortfalls. A demand response request is referred to as a demand response event, and can be sent to a customer via email or text message, or via an automated signal, wherein the latter may be referred to as automated demand response (ADR). When a demand response event is sent to a customer, it is the customer's responsibility to take actions to reduce electrical usage for some period of time specified in the event message—this typically means that some number of electrical loads in one or more customer facilities are shut down and/or run at reduced capacity.

During demand response when equipment is shutdown or running at reduced capacity, it can be possible to adversely affect conditions in the facility. In addition, a demand response event can have different intensity levels. Previous approaches to demand response may not provide sufficient flexibility to accommodate different event intensity levels while maintaining for adequate control of facility equipment without impact to conditions. For instance, facility loads may be set to take one action only during demand response despite differing event severity levels. Additionally, there may be multiple settings for demand response located in different locations in user interfaces resulting in an over-complicated workflow. Previous user interfaces for demand response configuration in a facility may not provide a way for building managers to quickly configure a large number of loads while also being able to customize a demand response strategy. Further, previous interfaces may not provide a summary of the demand response strategy that has been configured for a given facility.

Demand response (e.g., demand control) in accordance with one or more embodiments of the present disclosure can provide flexibility in controlling a facility. For instance, loads may be set to take different actions according to differing event seventies. Building managers using embodiments here can configure a large number of loads, visualize their demand response strategy, and customize that strategy, all at a glance.

Embodiments of the present disclosure can include a comprehensive ADR system provided to a user that allows for easier configuration compared to previous approaches. In some embodiments, for instance, ADR events from a demand response automation server (DRAS) can be parsed (e.g., by an executive control module) and passed along to a demand control service component (sometimes referred to herein simply as "computing device."). The computing device can take information about operation mode (e.g., event severity), target (e.g., required electricity reduction), target type (e.g., electricity reduction or firm kW threshold), etc. to determine what actions the facility (e.g., devices and/or loads of the facility) should take. Those determined actions can be passed to equipment controllers, which can execute them. Embodiments herein include a user interface that allows monitoring of the whole facility, as well as quick configuration of loads and/or settings.

As discussed further below, the user interface can include monitoring screens that show information about all loads of the facility, configuration screens (e.g., tabs) that allow all facility settings to be configured at once, and load configuration screens (e.g., pop-ups) that allow bulk configuration of loads.

In addition, embodiments here can allow the selection of different strategies including, for example, load rolling and load staging. Different strategies can be assigned to each of the different operation modes for events. Moreover, embodiments herein can utilize virtual shed groups instead of fixed registers, wherein loads can be assigned a group number. Virtual shed groups can allow for a larger number of participating loads compared to previous approaches.

A demand limiting schedule in accordance with embodiments herein can allow for more scheduling flexibility in that each alternate schedule and/or special event can have a separate set of limiting targets for greater control. A demand settings component can provide a level of abstraction between the service (e.g., the computing device) and each load. As a result, new load types and/or load strategies can be added without modifying the service, and third party loads can be used by configuring a strategy (e.g., in wiresheet) and using the demand settings component's shed output to drive logic.

As referred to herein, an event can include a signal and/or a request to reduce load. An event can be a signal in response to which a number of loads are shut down or run at reduced capacity. In some embodiments, events can be sent (e.g., issued) from a utility. In some embodiments, events can be scheduled (e.g., manually scheduled) by facilities themselves. It is noted that where the singular "facility" is used herein, such reference can refer to any number of structures, buildings, plants, refineries, sites, etc.

Load, as referred to herein, includes electricity use by one or more devices and/or systems. For example, loads can refer to units and/or systems associated with heating, ventilation, and air conditioning (HVAC), refrigeration, lighting, and/or industrial equipment, among others.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of loads" can refer to one or more loads.

FIG. 1 illustrates a system 100 for providing demand response in accordance with one or more embodiments of the present disclosure. As shown in FIG. 1, the system 100 can include a demand control service (DCS) component 102. The DCS 102 can be a computing device, for instance.

DCS 102 can be, for example, a laptop computer, a desktop computer, or a mobile device (e.g., a mobile phone, a personal digital assistant, etc.), among other types of computing devices.

As shown in FIG. 1, DCS 102 includes a memory 103 and a processor 105 coupled to memory 103. Memory 103 can be any type of storage medium that can be accessed by processor 105 to perform various examples of the present disclosure. For example, memory 103 can be a non-transitory computer readable medium having computer readable instructions (e.g., computer program instructions) stored thereon that are executable by processor 105 to provide demand response in accordance with one or more embodiments of the present disclosure.

Memory 103 can be volatile or nonvolatile memory. Memory 103 can also be removable (e.g., portable) memory, or non-removable (e.g., internal) memory. For example, memory 103 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 103 is illustrated as being located in DCS 102, embodiments of the present disclosure are not so limited. For example, memory 103 can also be located internal to another computing resource (e.g., enabling computer readable instructions to be downloaded over the Internet or another wired or wireless connection).

As shown in FIG. 1, DCS 102 can also include a user interface 106. User interface 106 can include, for example, a display (e.g., a screen). The display can be, for instance, a touch-screen (e.g., the display can include touch-screen capabilities).

User interface 106 (e.g., the display of user interface 106) can provide (e.g., display and/or present) information to a user of DCS 102. For example, user interface 106 can provide the user interfaces 210, 326, 432, 534, and/or 636, described herein in connection with FIGS. 2-6 to the user.

Additionally, DCS 102 can receive information from the user of DCS 102 through an interaction with the user via user interface 106. For example, DCS 102 (e.g., the display of user interface 106) can receive input from the user via user interface 106. The user can enter the input into DCS 102 using, for instance, a mouse and/or keyboard associated with DCS 102, or by touching the display of user interface 106 in embodiments in which the display includes touch-screen capabilities (e.g., embodiments in which the display is a touch screen).

The DCS can receive an indication of a demand response event (illustrated in FIG. 1 as "demand response signal" and hereinafter referred to as "event 106"). As previously discussed, an event can include a signal and/or a request to adjust (e.g., reduce) load. An event can be a signal in response to which a number of loads are shut down or run at reduced capacity. In order to reduce loads, operations of one or more devices can be adjusted. Such adjustment may be made in order to meet a usage target (e.g., kilowatt hour target). In some embodiments, one or more devices can be deactivated (e.g., according to a schedule). In some embodiments, setpoints associated with one or more devices can be modified.

In some embodiments, events can be sent (e.g., issued) from a utility. In some embodiments, events can be passed from a virtual top node (VTN) and/or aggregator. For example, a demand response signal 106 can be received from a demand response automation server. In some embodiments, events can be scheduled (e.g., manually scheduled) by facilities themselves. Accordingly, an indication of an event can be received based on a manually-scheduled demand response event 104.

The system 100 can include a plurality of loads (referred to collectively as "loads 108"). For instance, the system 100 can include a first load 108-1, a second load 108-2 (e.g., "Rooftop Unit"), a third node 108-3 (e.g., "Third Party Device"), and a fourth load 108-4 (e.g., "BACnet device"). Though four loads 108 are shown in FIG. 1, embodiments of the present disclosure can include more or fewer loads. Additionally, the types of loads illustrated in FIG. 1 (e.g., "Rooftop Unit," "Third Party Device," "BACnet device" are used as example types; embodiments of the present disclosure are not limited to the types illustrated in FIG. 1.

Each of the loads 108 can be in communication with the DCS 102 via a demand settings component. In some embodiments the demand settings component(s) can receive command(s) to shed load from the DCS 102 and can communicate status information back to the DCS 102. The DCS 102 can receive events as described above and determine which loads are to be reduced and/or how the reduction is to take place. Such information can be communicated to the demand settings component(s) via the shed command(s). For the Rooftop Unit load 108-2 and the BACnet device load 108-4, the corresponding demand settings components can direct modifications to control settings in order to reduce load.

For the load 108-1, the shed command output of its demand settings component can be linked to a Boolean output point (e.g., an arbitrary Boolean output point). For the Third Party Device load 108-3, a wiresheet logic setup can be configured. For instance, the demand settings component of the load 108-3 can be linked to an output point. In some embodiments, the wiresheet logic can use additional information from the demand settings component of the load 108-3.

FIG. 2 illustrates a user interface 210 associated with monitoring demand control in accordance with one or more embodiments of the present disclosure. The interface 210 can be displayed when the selectable display element (e.g., tab) 212 is selected. As shown in FIG. 2, the interface 210 can include a current status portion 216, a views portion, and a demand loads overview portion 218. Selection of another tab 214 can cause the display of a demand control settings interface, discussed further below in connection with FIG. 6.

The current status portion 216 can include information associated with a current status of a demand response event associated with a facility. Such information, can include, for instance, current activity state (e.g., level) of the event, current operation mode, current power usage, current shed target, current baseline, etc. Such information may be general in nature in that it may not be particular to one or more specific loads but may refer to the loads of the facility of a whole, for instance.

The views portion can include selectable display elements which, when selected, can cause the display of other user interfaces. For instance, selection of the event level configuration button 220 can cause the display of an interface 326 discussed below in connection with FIG. 3. Selection of the limiting schedule button 224 can cause the display of an interface 432 discussed below in connection with FIG. 4. Selection of the limiting targets button 222 can cause the display of an interface 534 discussed below in connection with FIG. 5.

The demand loads overview portion 218 can include information associated with the demand response event particular to each of a plurality of loads associated with the facility. Such information can be specific to a current event. For instance, each row in the demand loads overview portion 218 can correspond to an individual load in the facility having a demand settings component (previously discussed). For each load, information can be provided in a dashboard-style at-a-glance format such as, for example, demand control enabled/disabled status, shed group identification, command status, actual status, time in shed, time in restore, zone temperature, active setpoint, load feedback, etc. Accordingly, a user can be made aware of the status of the event as it pertains to individual loads. At times in which an event is not occurring, information may be blanked out, for instance.

Once loads are added, they can be configured by selecting the event level configuration button 220. The interface can then provide a pop-up window with a table displaying settings for each operation mode and allow for configuration.

FIG. 3 illustrates an interface 326 associated with configuring loads in accordance with one or more embodiments of the present disclosure. The interface 326 can be provided following the selection of the event level configuration button 220 on the interface 210, previously described in connection with FIG. 2. The interface 326 can receive configuration modifications to each of the plurality of loads, for instance. The configuration modifications can include modifications to a plurality of settings for each of a plurality of operation modes associated with the plurality of loads The interface 326 can include a number of portions (e.g., tabs) corresponding to different operation modes. In some embodiments, operation modes can include "limiting," "normal," "moderate," "high," and/or "special," though embodiments of the present disclosure are not so limited. Selection of a particular operation mode can allow for configuration of loads in that mode. For instance, as shown in FIG. 3, the "normal" event settings tab is selected.

Embodiments of the present disclosure can allow for the configurations of multiple loads to be modified at once. For instance, the loads "RTU Sales Front" and "RTU Sales Middle" are both selected in the example illustrated in FIG. 3. Also as shown, selection of the "shed strategy" configuration column can cause the display of a pop-up window 328 allowing for the modification of that configuration for both loads simultaneously.

Selection of the demand response schedule button of the interface 210, previously described in connection with FIG. 1, can cause the display of an interface associated with scheduling manual demand response events. In some embodiments, normal, moderate, high, and/or special events can be scheduled. In some embodiments, alternate and/or special events can be set up in addition to scheduled (e.g., weekly) events.

Figure 4:
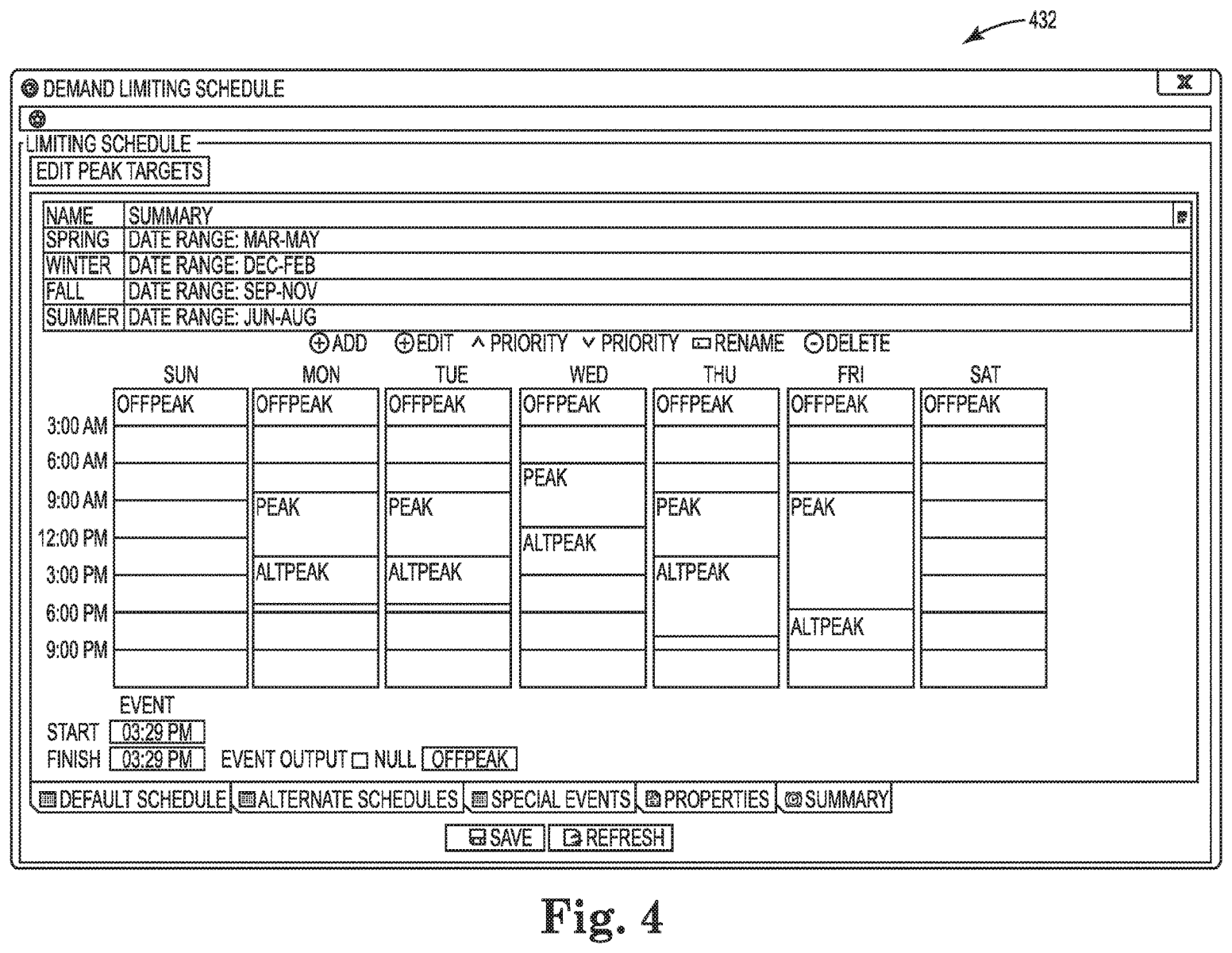

FIG. 4 illustrates an interface 432 associated with scheduling limiting events in accordance with one or more embodiments of the present disclosure. Selection of the limiting schedule button 224 (previously described in connection with FIG. 2) can cause the display of the interface 432, for instance. A limiting event can be scheduled for a particular period of time, at a particular time, on one or more days of a week. The limiting event(s) can be "peak," "off-peak," or "alt-peak" events according to some embodiments. Such differentiation can allow for flexibility in a limiting strategy by accounting for time of varying usage. For example, during the middle of a summer day, a peak limiting event may be scheduled instead of an off-peak event to prevent the facility from shedding a particular amount (e.g., too much for comfort).

In contrast with previous approaches, where users may be restricted to 12 alternate schedules representing different months, embodiments herein can allow for the creation and/or modification of customizable schedules. Each schedule can have its own set of peak values (e.g., 3 peak values). Such embodiments can provide the ability for an enterprise to batch push a limiting schedule to a number of different facilities while allowing each facility to maintain its own peak values, which may vary based on location, for instance.

FIG. 5 illustrates an interface 534 associated with modifying peak targets in accordance with one or more embodiments of the present disclosure. Selection of the limiting targets button 222 from the user interface 210, previously described in connection with FIG. 2, can cause the display of interface 534, for instance. In some embodiments, the interface 534 can be a pop-up window that allows for the editing of peak targets in bulk. The interface 534 can display the peak targets for a weekly schedule. The interface 534 can display the peak targets for each special event. The interface 534 can display the peak targets for one or more alternate schedules. Selection of one or more schedules (as shown in FIG. 5) can allow the modification of one or more aspects of the peak target(s).

Figure 6:
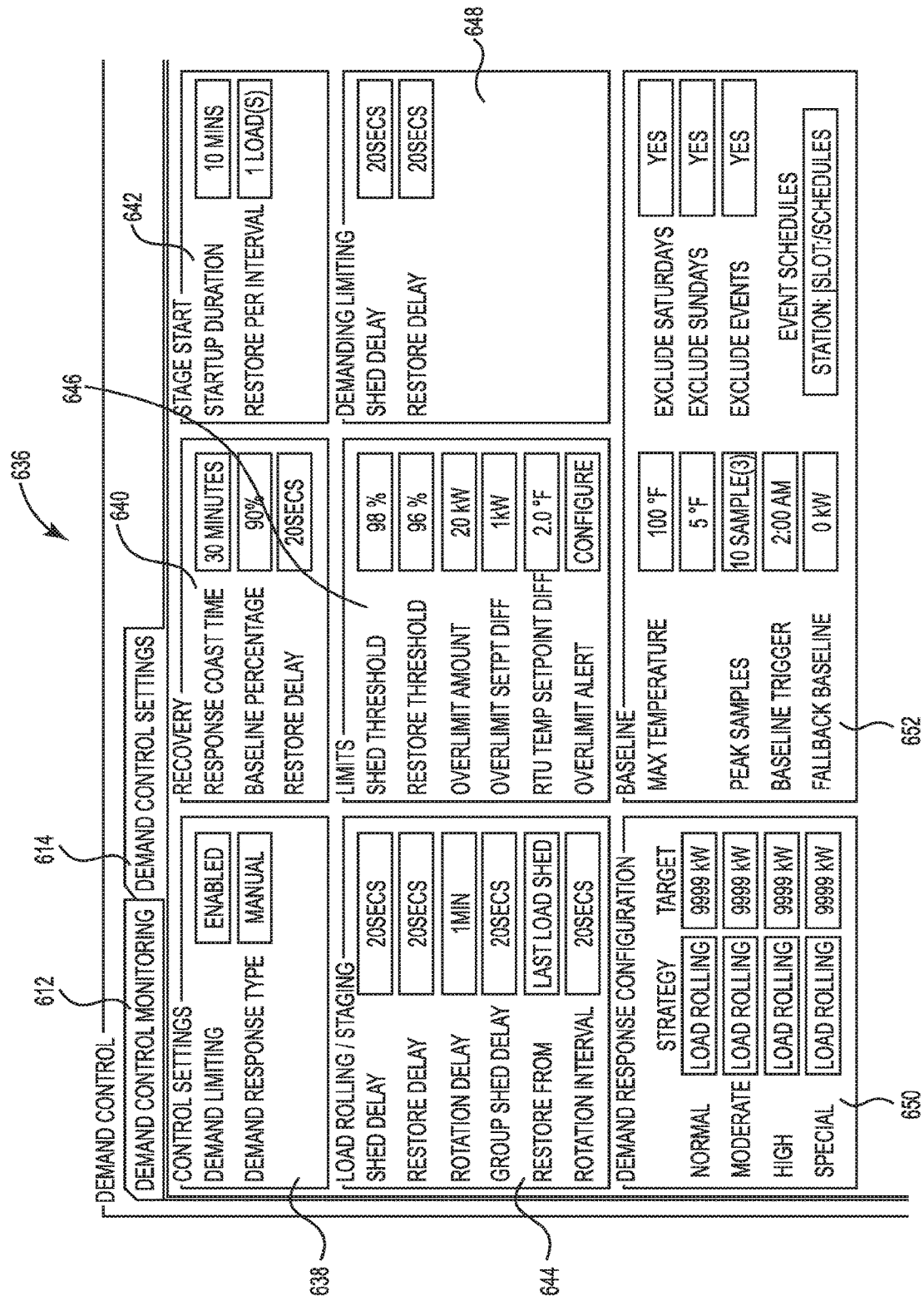
FIG. 6 illustrates an interface associated with modifying demand control settings in accordance with one or more embodiments of the present disclosure.

FIG. 6 illustrates an interface 636 associated with modifying demand control settings in accordance with one or more embodiments of the present disclosure. The settings modified using the interface 636 can be modifications non-specific to any one particular load, for instance (e.g., settings that relate to the ADR system as a whole). Selection of the tab 214, previously described in connection with FIG. 2 and illustrated as tab 614 in FIG. 6, can cause the display of the interface 636, for instance.

The interface 636 can include a control settings portion 638, a recovery portion 640, a stage start portion 642, a load rolling/staging portion 644, a limits portion 646, a demand limiting portion 648, a demand response configuration portion 650, and a baseline portion 652, though embodiments of the present disclosure are not so limited.

The control settings portion 638 can be configured to allow for enabling and/or disabling demand limiting. The control settings portion 638 can be configured to set a demand response type (e.g., none, manual, or ADR service).

The recovery portion 640 can be configured to set a recovery time taken after an event ends to gradually restore each of a plurality of loads, for instance. A baseline percentage can be set, which can specify a starting recovery target. A restore delay time can be set, which can specify a time in between the restoration of loads.

The stage start portion 642 can include portion configured to modify a startup duration, which can indicate how long it may take for all loads to be restored following a station startup. A restore per interval value can be set, which can designate how many loads are to be restored for each interval.

The load rolling/staging portion 644 can allow settings for shed delay and/or restore delay. Such delays may refer to a respective amount of delay between shedding and restoring loads individually. Rotation delay can allow the modification of an amount of time between in-group rotation. Group shed delay can allow the modification of a delay between shedding full groups (e.g., an initial behavior of a staging strategy until a target is met). "Restore from" can allow the selection of whether loads restored during staging are to be restored in an order they were shed or in an order of the most recently shed load being restored first. Rotation interval can refer to a load rolling strategy and can allow the modification of an interval between switching which group is shed.

The limits portion 646 can allow modification of shed and restore thresholds. The limits portion 646 can allow modification of an overlimit alert amount. For example, an overlimit alert can trigger an alarm if current demand surpasses a demand target for a particular period of time (e.g., a threshold-exceeding period of time).

The demand limiting portion 648 can allow modification of the shed delay for limiting. The demand limiting portion 648 can allow modification of the restore delay for limiting.

The demand response configuration portion 650 can allow a selection between a load rolling strategy and a load staging strategy. Demand limiting may use a load staging strategy by default, for instance. If, for example, a facility is using a manual demand response mode, a manual target for each operation mode can be configured and/or modified.

The baseline portion 652 can allow modification of information associated with a baseline. For example, the baseline portion 652 can allow configuration of baseline binning.

Load staging, as referred to herein, is a strategy in which loads can be divided into shed groups based on importance. Loads designated as more critical loads may tend to be placed in higher-numbered shed groups. Less important loads may be placed in lower-numbered shed groups. Other loads, such as lighting, for instance, may be placed in a continuous shed group. When an event begins, all continuous loads can be shed, in some embodiments. The first group can then be shed. If a group rotation delay elapses and the current usage remains above a threshold (e.g., a "shed above" usage), a second group can be shed. This process can continue until the current usage falls below a "shed above" range or all groups have been shed. If the current usage falls below a "restore below" range, a restore delay timer can be activated. Once the restore delay timer elapses, a load can be restored and the timer can be restarted. If the current usage rises above the "shed above" range again, one load can be shed at a time. If current usage remains within a deadband range, then a partially shed group can rotate which loads are shed.

Load rolling, as referred to herein, is a strategy in which loads can be placed in different groups with no preference of importance. In some embodiments, load rolling allows a single group to be shed at a time, but rotates one whole group every time the rotation interval timer elapses. If the facility's demand remains above a restore target, the rotation can continue spreading the effects of the demand curtailment among the configured shed groups by shedding another group and restoring the first group, one group at a time. If the demand drops below the restore target and remains below the restore target for at least one rotation interval, the load rolling strategy can terminate the periodic group rotation and loads can begin to be restored. The load rolling strategy can then return to group rotation if the demand rises above a shed target. If the demand remains between the shed target and the restore target, the current mode can be continued, either rotating the shed group or waiting for the demand to rise into the shed range.

In previous approaches, ADR may include a number of (e.g., 2) "shed registers" with a fixed number of slots to which loads are attached. Such loads may have a single response (e.g., setpoint adjust or load shed off) irrespective of what type of event was received. In contrast, embodiments of the present disclosure can utilize virtual shed groups which can be read at the time of an event. Each load can have a different shed group for each different operation mode, thereby allowing a greater deal of flexibility when configuring a strategy. When a demand response action is taken by the DCS (previously discussed in connection with FIG. 1), the DCS can query demand settings component(s) in the facility to determine which loads can be acted upon based on their shed group for the current operation mode. Accordingly, each load can respond differently depending on the type of event. For a normal event, for instance, a load may undergo a setpoint adjustment of two degrees. For a moderate event, for instance, when demand reduction is more urgently needed, the load could be shut off entirely. Similarly, a normal event can utilize a higher number of (e.g., four) shed groups for gradual shedding to meet its target, while a high event may use a lower number of (e.g., 2) shed groups for a quicker response.

Embodiments of the present disclosure can allow for more logical configuration than previous approaches. A multitude of aspects of ADR control can be overseen and/or modified from one place (e.g., the computing device described above in connection with FIG. 1). For instance, the computing device can configure aspects of the facility as a whole (e.g., strategy, timers, etc.), and individual loads themselves (e.g., shed strategies, shed groups, etc.). Additionally, the computing device can configure devices and allow for a user to check on a device that may not be operating as expected.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for providing demand response, the method comprising:
   receiving an indication of a demand response event;
   customizing a demand response strategy for each of two or more loads of a facility in response to the indication of the demand response event, wherein customizing the demand response strategy comprises:
   determining a first action to be executed by a first load of the two or more loads of the facility, wherein the first action to be executed is determined by an input from a user via a user interface, wherein the user interface includes two or more selectable display tabs, and the input received from the user is received via one of the two or more selectable display tabs;
   communicating the first action to a controller associated with the first load for execution;
   determining a second action to be executed by a second load of the two or more loads of the facility, wherein the second action to be executed is determined by a second input from the user via one of the two or more selectable display tabs; and
   communicating the second action to a controller associated with the second load for execution;
   monitoring a status of the first action and a status of the second action; and
   displaying the status of the first action and the status of the second action concurrently on one of the two or more selectable display tabs of the user interface.

2. The method of claim 1, wherein the indication is a demand response signal received from a demand response automation server.

3. The method of claim 1, wherein the demand response event is a manually-scheduled demand response event.

4. The method of claim 3, wherein the manually-scheduled demand response event is one of a plurality of different available event types.

5. The method of claim 1, wherein the demand response strategy is dependent on a severity level of the demand response event.

6. The method of claim 1, wherein the demand response event is a limiting event.

7. The method of claim 1, wherein one of the two or more selectable display tabs of the user interface includes a demand loads overview portion.

8. The method of claim 1, wherein the demand response event is a limiting event, and wherein the method includes receiving a schedule associated with the limiting event having a set of peak values.

9. The method of claim 1, wherein the first action to be executed by the first load is determined based, at least in part, on a user selection of a load staging strategy or a load rolling strategy.

10. A system for providing demand response, comprising:
    a processor; and
    a memory configured to store instructions which, when executed by the processor, cause the processor to:
    provide an interface having two or more selectable display tabs, a first one of the two or more selectable display tabs responsive to a first input, to:
    monitor and display a current status of a demand response event associated with a facility;
    display first information associated with the demand response event, wherein the first information specifically refers to each of a plurality of loads associated with the facility; and
    receive a customized demand response strategy for each of the plurality of loads, wherein the customized demand response strategy includes concurrent modifications to each of a plurality of demand response event operation modes associated with the plurality of loads; and a second one of the two or more selectable display tabs responsive to a second input to:
display second information associated with the demand response event, wherein the second information does not specifically refer to each of the plurality of loads associated with the facility.

11. The system of claim 10, wherein the displayed current status of the demand response event includes an indication of a current activity level of the demand response event.

12. The system of claim 10, wherein the displayed current status of the demand response event includes an indication of a current demand response event operation mode associated with the plurality of loads.

13. The system of claim 10, wherein the concurrent modifications include modifications to a plurality of settings for a manual demand response event.

14. The system of claim 10, wherein customizing the customized demand response strategy is based on a severity level of the demand response event.

15. The system of claim 10, wherein one of the two or more selectable display tabs of the user interface includes a demand loads overview portion.

16. A non-transitory computer readable medium having computer readable instructions stored thereon which, when executed by a processor, cause the processor to:
receive an indication of a demand response event;
customize, based on an input received from a user interface, a demand response strategy for each of two or more loads of a facility in response to the indication of the demand response event, wherein customizing the demand response strategy comprises:
determining a first action to be executed by a first load of the two or more loads of the facility, wherein the first action to be executed is determined by an input from a user via the user interface, wherein the user interface includes two or more selectable display tabs, and the input received from the user is received via one of the two or more selectable display tabs;
communicating the first action to a controller associated with the first load for execution;
determining a second action to be executed by a second load of the two or more loads of the facility, wherein the second action to be executed is determined by a second input from the user via one of the two or more selectable display tabs; and
communicating the second action to a controller associated with the second load for execution;
monitor a status of the first action and a status of the second action; and
display the status of the first action and the status of the second action concurrently on one of the two or more selectable display tabs of the user interface.

17. The medium of claim 16, wherein the demand response strategy is dependent on a severity level of the demand response event.

18. The medium of claim 16, wherein one of the two or more selectable display tabs of the user interface includes a demand loads overview portion.

19. The medium of claim 16, wherein the first action to be executed by the first load is determined based, at least in part, on a user selection of a load staging strategy or a load rolling strategy.

20. The medium of claim 16, wherein the indication is a demand response signal received from a demand response automation server.

* * * * *